(12) United States Patent
Pakalns et al.

(10) Patent No.: US 7,263,284 B2
(45) Date of Patent: Aug. 28, 2007

(54) PROTECTIVE HOUSING ASSEMBLY FOR CAMERAS

(76) Inventors: Ron Pakalns, 112 Clark Ave., Thornhill, Ontario (CA) L3T 1S9; Vito Cappelli, 24 Findhorn Crescent, Maple, Ontario (CA) L6A 1M2

( * ) Notice: Subject to any disclaimer, the term of this patent is extended or adjusted under 35 U.S.C. 154(b) by 289 days.

(21) Appl. No.: 11/052,050

(22) Filed: Feb. 8, 2005

(65) Prior Publication Data

US 2005/0201740 A1    Sep. 15, 2005

Related U.S. Application Data

(60) Provisional application No. 60/547,444, filed on Feb. 26, 2004.

(51) Int. Cl.
*G03B 17/08* (2006.01)
(52) U.S. Cl. ........................ 396/25; 396/428
(58) Field of Classification Search ............... 396/25, 396/27, 419, 427, 428; 348/81, 82, 373–375; 206/316.2
See application file for complete search history.

(56) References Cited

U.S. PATENT DOCUMENTS 4,281,343 A * 7/1981 Monteiro .................... 348/81
5,068,720 A * 11/1991 Herlitz et al. ................ 348/82

* cited by examiner

*Primary Examiner*—W. B. Perkey
*Assistant Examiner*—Rishi S. Suthar
(74) *Attorney, Agent, or Firm*—Robert F. Delbridge

(57) ABSTRACT

A protective housing assembly for a camera has a carrier member securable to a support, a tubular protective member detachably secured at a rear end to the carrier member, and a front end cap detachably secured to a front end of the tubular protective member, the front end cap having a transparent window. The carrier member has a camera mounting member which enables a camera to be detachably secured thereto whereby the camera is located within the tubular protective member and oriented to receive light from the exterior through the transparent window of the front end cap.

6 Claims, 2 Drawing Sheets

PROTECTIVE HOUSING ASSEMBLY FOR CAMERAS

RELATED APPLICATION

This invention claims priority from U.S. Provisional patent application No. 60/547,444 filed Feb. 26, 2004.

FIELD OF INVENTION

The present invention relates to protective housing assemblies for cameras.

BACKGROUND OF THE INVENTION

It has become commonplace to use cameras in industrial manufacturing environments, for example in automated inspection systems. The environment may be harsh, for example with exposure to dust, water, cleaning solvents, grease and oil and direct impact from other objects. In order for a camera to function properly, especially in such an environment, it must be adequately protected. Although some protective housing assemblies for cameras in such an environment are known, there is a need for a more suitable protective housing assembly for cameras used in such environments.

It is therefore an object of the invention to provide an improved protective housing assembly for cameras suitable for use in a harsh environment.

SUMMARY OF THE INVENTION

According to the invention, a protective housing assembly for a camera has a carrier member securable to a support, a tubular protective member detachably secured at a rear end to the carrier member, and a front end cap detachably secured to a front end of the tubular member, the front end cap having a transparent window. The carrier member has a camera-mounting member which enables a camera to be detachably secured thereto within the tubular protective member and oriented to receive light from the exterior through the transparent window of the front end cap.

The tubular protective member may be detachably secured to the carrier member in a sealing manner, the front end cap may be detachably secured to the tubular protective member in a sealing manner, and a carrier member may have a pair of passages extending from the exterior to within the tubular protective member to enable the interior of the housing assembly to be pressurized, heated, cooled or purged.

The carrier member may also have an aperture through which a control cable from a camera within the housing assembly can pass in a sealing manner from the camera to the exterior.

The front end cap may be detachably secured to the tubular protective member and the tubular protective member may be detachably secured to the carrier member by releasable fastening devices in the form of manually-operated draw latches.

BRIEF DESCRIPTION OF THE DRAWINGS

One embodiment of the invention will now be described, by way of example, with reference to the accompanying drawings, of which.

DESCRIPTION OF PREFERRED EMBODIMENT

Figure 1:
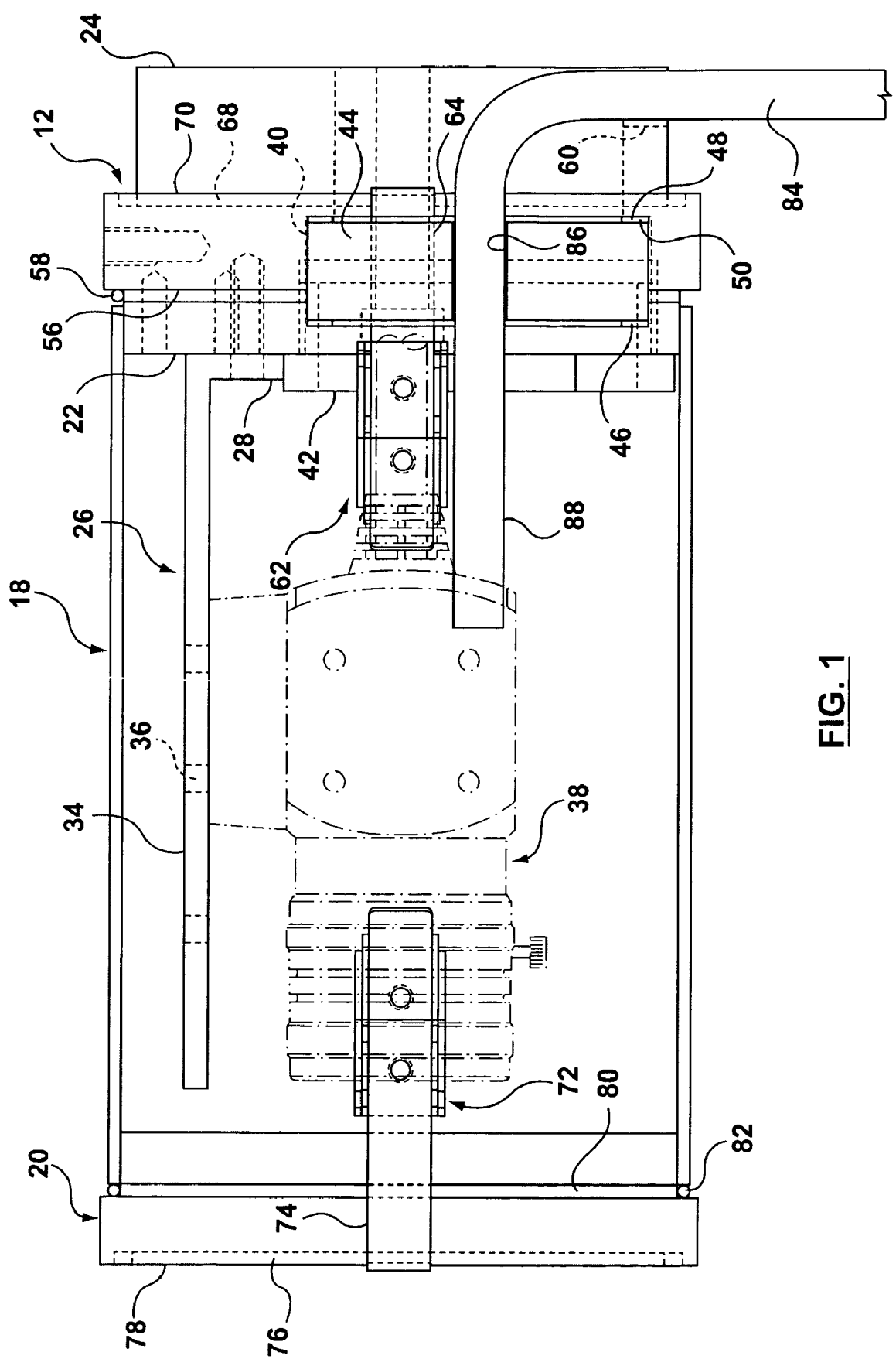
FIG. 1 is a somewhat diagrammatic side view of a protective housing assembly for cameras in accordance with one embodiment of the invention.
Figure 2:
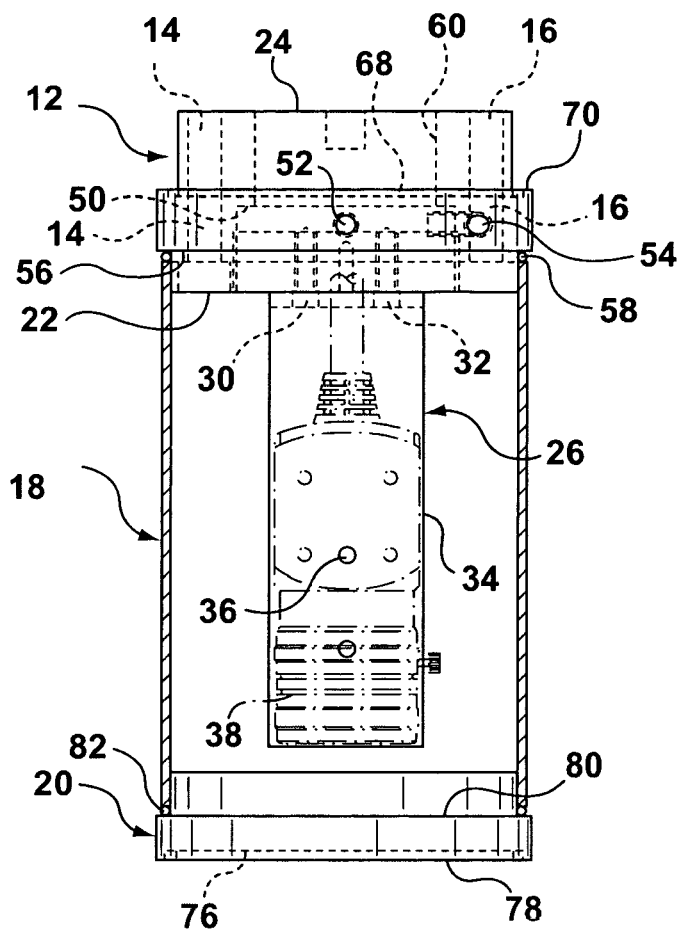
FIG. 2 is a top view thereof.
Figure 3:
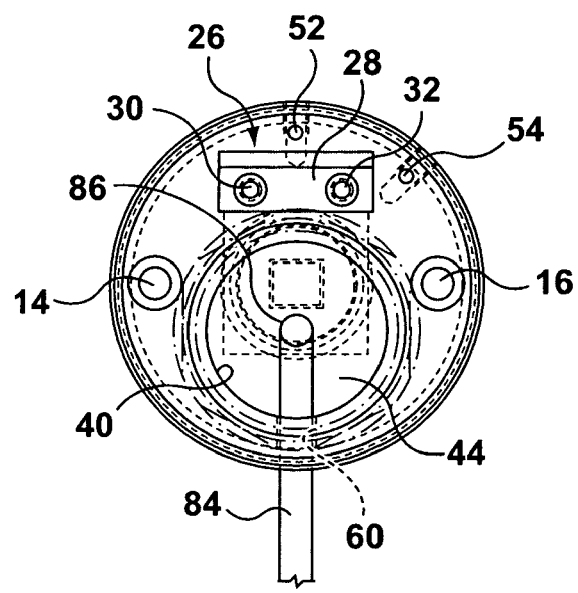
FIG. 3 is an end view thereof.

Referring to the drawings, a protective housing assembly for a camera has a metal carrier member 12 securable to a support (not shown), for example, by bolts (not shown) passed through bolt holes 14, 16, in the carrier member 12. An elongated tubular protective member 18 of stainless steel is securable at one end to the carrier member 12, and a front-end cap 20 of acrylic material is securable to the opposite end of the tubular member 18.

The carrier member 12 has a circular periphery and has front and rear faces 22, 24. A camera-mounting member 26 of aluminum has an attachment portion 28 secured to the front face 22 of the carrier member 12 by screws 30, 32 and a main portion 34 projecting forwardly from the attachment portion 28. The main portion 34 has a number of apertures 36 to enable a camera 38 to be secured thereto by bolts (not shown).

The carrier member 12 also has a relatively large circular aperture 40 extending from the front face 22 to the rear face 24. The interior of the front portion of the aperture 40 is screw-threaded to receive an externally-threaded securing ring 42 which retains a disk-like seal 44 of polymeric material and metal sealing rings 46, 48 adjacent a forwardly facing shoulder 50 in the wall of the aperture 40. The periphery of the front-end portion of the securing ring 42 is shaped for engagement by a wrench.

The carrier member 12 further has two small passages 52, 54 which extend from the periphery of the carrier member 12 to the front face 22 for a purpose which will be described later.

The periphery of the carrier member 12 also has a forwardly facing shoulder 56 which is engagable by a sealing ring 58 surrounding the carrier member 12 forwardly of the shoulder 56 for a purpose which will also be described later. Adjacent to the rear end of the aperture 40, the carrier member 12 has a cutout 60 in its periphery, again for a purpose to be described later.

The rear end of the tube member 18 is provided with a pair of releasable fasteners in the form of diametrically opposite manually-operated draw latches 62 (only one of which is shown) which each have a hook portion 64 which engages in an annular groove 68 in a rearwardly facing shoulder 70 on the periphery of the carrier member 12 to secure the rear end of the tubular member 18 to the carrier member 12. The rear end portion of the tubular member 18 slides over the front-end portion of the carrier member 12 so that the end of the tubular member 18 engages the sealing ring 58 and presses it against the shoulder 56 of the carrier member 12 to effect a sealed connection.

Similarly, the front end of the tubular member 18 is provided with a pair of releasable fasteners in the form of diametrically opposite manually-operated draw latches 72 (only one of which is shown) which each have a hook portion 74 which engages in an annular groove 76 in the front face 78 of the cap 20. The peripheral of cap 20 has a rearwardly facing shoulder 80 which is engaged by a sealing ring 82 surrounding the cap 20 rearwardly of the shoulder 80. The front end of the tubular member 18 slides on the rear end portion of the cap 20 so that the end of the tubular member 18 engages a sealing ring 82 and presses it against the shoulder 80 to effect a sealed connection.

In use, the camera 38 is secured to the mounting member 26 and the mounting member 26 is then secured to the carrier member 12. A control cable 84 extending from the camera 38 is passed through a previously made suitably sized aperture 86 in the disk-like seal 44 and positioned in the cut out 60. The seal 44 engages the cable 84. The carrier member 12 is then bolted to a suitable support. Because the cable 84 passes through the cut out 60, the rear face 24 of the carrier member 12 can fit flush with a flat front surface of the support. The tubular member 18 is then secured to the carrier member 12 and the cap 20 is then secured to the tubular member 18. The cap 20 is transparent, and the mounting member 26 positions the camera 38 so that the center of its lens is on the longitudinal centerline of the tubular member 18.

The advantages of the invention will now be readily apparent to a person skilled in the art from the foregoing description of a preferred embodiment. For example, the protective housing assembly is compact, rear-mounted, holds the camera securely and is watertight. It is easy to use and provides easy and quick access to the camera. Further, it can be used with most currently available cameras, and if desired tubular members of different lengths can be provided for cameras of different lengths. The cap can easily be cleaned and replaced if damaged. The provision of the passages 52, 54 in the carrier member 12 enables the interior of the housing assembly to be easily pressurized, heated, cooled or purged. The components can be made of corrosion resistant materials. Also, because of the provision of latches which engage annular grooves, the tubular member and cap can be positioned in an optimum circumferential orientation so as to provide satisfactory manual access to the latches. The camera cable can exit from the side (as described) or from the rear. If from the side, the cable-bending radius can be within the camera manufacturer's recommendations.

Other advantages and embodiments of the invention will also now be readily apparent to a person skilled in the art.

The invention claimed is:

1. A protective housing assembly for a camera, said housing assembly having:
   a carrier member securable to a support, said carrier member having a rear face which can be fitted flush with a flat front face on a support,
   a tubular protective member detachably secured at a rear end to the carrier member,
   a front end cap detachably secured to a front end of the tubular protective member, the front end cap having a transparent window, and
   the carrier member having a camera mounting member which enables a camera to be detachably secured thereto whereby the camera is located within the tubular protective member and oriented to receive light from the exterior through the transparent window of the front end cap,
   the carrier member also having an aperture through which a camera control cable passes in sealing manner from the camera towards the exterior, and the carrier member also having a cut out communicating with the aperture and the side periphery of the carrier member and through which the cable passes so as to leave the assembly through the side of the carrier member.

2. A protective housing assembly according to claim 1 wherein the tubular protective member is detachably secured to the carrier member in a sealing manner, the front end cap is detachably secured to the tubular protective member in a sealing manner, and the carrier member has a pair of passages extending from the side periphery thereof to within the tubular protective member to enable the interior of the housing assembly to be pressurized, heated, cooled or purged.

3. A protecting housing assembly according to claim 1 wherein the front end cap is detachably securable to the tubular protective member and the tubular protective member is detachably securable to the carrier member by releasable fastening devices in the form of manually-operated draw latches,
   the draw latch securing the front end cap to the tubular member being secured to the tubular member and having a hook portion detachably engagable in an annular groove in the front end cap, and the draw latch securing the tubular member to the carrier member being secured to the tubular member and having a hook portion detachably engagable in an annular groove in the carrier member.

4. A camera and protective housing assembly having:
   a carrier member securable to a support, said carrier member having a rear face which can be fitted flush with a flat front face on a support,
   a tubular protective member detachably secured at a rear end to the carrier member,
   a front end cap detachably secured to a front end of the tubular member, the front end cap having a transparent window,
   the carrier member having a camera mounting member, and
   a camera detachably secured to the carrier member within the tubular protective member and oriented to receive light from the exterior through the transparent window of the front end cap,
   the carrier member also having an aperture through which a camera control cable passes in sealing manner from the camera towards the exterior, and the carrier member also having a cut out communicating with the aperture and the side periphery of the carrier member and through which the cable passes so as to leave the assembly through the side of the carrier member.

5. A camera and protective housing assembly according to claim 4 wherein the tubular protective member is detachably secured to the carrier member in a sealing manner, the front end cap is detachably secured to the tubular protective member in a sealing manner, and the carrier member has a pair of passages extending from the side periphery thereof to within the tubular protective member to enable the interior of the housing assembly to be pressurized, heated, cooled or purged.

6. A camera and protective housing assembly according to claim 4 wherein the front end cap is detachably secured to the tubular protective member and the tubular protective member is detachably secured to the carrier member by releasable fastening devices in the form of manually-operated draw latches,
   the draw latch securing the front end cap to the tubular member being secured to the tubular member and having a hook portion detachably engagable in an annular groove in the front end cap, and the draw latch securing the tubular member to the carrier member being secured to the tubular member and having a hook portion detachably engagable in an annular groove in the carrier member.

* * * * *